US012683284B2

(12) United States Patent
Edwards

(10) Patent No.: US 12,683,284 B2
(45) Date of Patent: Jul. 14, 2026

(54) PHASED ARRAY EXCITED MULTI-MODE WAVEGUIDE WITH OMNIDIRECTIONAL COVERAGE AND BEAM STEERING

(71) Applicant: L3Harris Technologies, Inc., Melbourne, FL (US)

(72) Inventor: Richard G. Edwards, Grantsville, UT (US)

(73) Assignee: L3Harris Technologies, Inc., Melbourne, FL (US)

( * ) Notice: Subject to any disclaimer, the term of this patent is extended or adjusted under 35 U.S.C. 154(b) by 43 days.

(21) Appl. No.: 18/939,861

(22) Filed: Nov. 7, 2024

(65) Prior Publication Data

US 2026/0128524 A1 May 7, 2026

(51) Int. Cl.

*H01Q 9/28* (2006.01)
*H01Q 3/30* (2006.01)
*H01Q 5/47* (2015.01)

(52) U.S. Cl.

CPC ................. *H01Q 9/28* (2013.01); *H01Q 3/30* (2013.01); *H01Q 5/47* (2015.01)

(58) Field of Classification Search

CPC .. H01Q 9/28; H01Q 3/30; H01Q 5/47; H01Q 21/062; H01Q 3/36; H01Q 21/22; H01Q 21/061; H01Q 23/00; H01Q 21/24; H01Q 17/00; H01Q 1/288; H01Q 3/46; H01Q 3/2617; H01Q 3/00

See application file for complete search history.

(56) References Cited

U.S. PATENT DOCUMENTS 9,735,469 B1 * 8/2017 West .................... H01Q 3/2682
10,749,258 B1 * 8/2020 West .................... H04B 7/0617
2021/0320431 A1 10/2021 Wu et al.

FOREIGN PATENT DOCUMENTS

CA 2246724 5/2005
GB 2201046 8/1988

OTHER PUBLICATIONS

R. G. Edwards et al., "Additive-Manufactured, Highly-Conductive Metasurfaces, With Application Enabling Secondary Properties, for Microwave Waveguide Components," in IEEE Access, vol. 10, Jun. 1, 2022, pp. 58921-58929.

R. G. Edwards et al., "Effective Conductivity of Additive-Manufactured Metals for Microwave Feed Components," in IEEE Access, vol. 9, Apr. 8, 2021, pp. 59979-59986.

(Continued)

*Primary Examiner* — David E Lotter

(74) *Attorney, Agent, or Firm* — NIXON & VANDERHYE P.C.

(57) ABSTRACT

An antenna for omnidirectional coverage and directional beam forming includes a multimode biconical waveguide with a first conical structure having a first base and a first apex, a second conical structure having a second base and a second apex, the first apex facing the second apex, and a radiation aperture. There is a coaxial interface between the first conical structure and the second conical structure that includes a coaxial waveguide to direct electromagnetic (EM) energy into the radiation aperture. An active electronic phased array (ASEA) included with the antenna controls independent sources of EM wave energy that excite multiple modes of the multimode biconical waveguide and provide omnidirectional radiation and directional beam steering.

19 Claims, 7 Drawing Sheets

(56) References Cited

OTHER PUBLICATIONS

F. Demmerle et al, "A Biconical Multibeam Antenna for Space-Division Multiple Access" IEEE Transactions on Antennas and Propagation, vol. 46, No. 6, Jun. 1998, pp. 782-787.
Extended European Search Report for EP Application No. 25210027.6 dated Mar. 16, 2026, 8 pages.

* cited by examiner

PHASED ARRAY EXCITED MULTI-MODE WAVEGUIDE WITH OMNIDIRECTIONAL COVERAGE AND BEAM STEERING

INTRODUCTION

The inventor recognized that it is desirable to provide an antenna that offers both full azimuth omnidirectional coverage along with the ability to steer and form nulls and beams.

SUMMARY

Some example embodiments provide an antenna for omnidirectional coverage and directional beam forming. The antenna includes a multimode biconical waveguide including a first conical structure having a first base and a first apex, a second conical structure having a second base and a second apex, the first apex facing the second apex, and a radiation aperture. A coaxial interface between the first conical structure and the second conical structure includes a coaxial waveguide that directs electromagnetic (EM) energy into the radiation aperture. The antenna further includes an active electronic phased array (ASEA) configured to control independent sources of EM wave energy that excite multiple modes of the multimode biconical waveguide and provide omnidirectional radiation and directional beam steering.

Example implementations may include one or more of the following features. The omnidirectional coverage of the antenna includes an omnidirectional antenna coverage pattern in azimuth with controllable gain near a horizon. The controllable gain near the horizon may be in a range of about [0 dB-20 dB] which depend on the final size of the aperture of the antenna. The directional beam steering includes one or more radiation beams steerable in elevation. The ASEA is controllable to rapidly change radiation beams including nulling in some directions and focused in other directions. The multimode biconical waveguide includes a radiation cavity between facing surfaces of the first conical structure and the first conical structure that defines physical dimensions of the radiation aperture. The radiation cavity may include a dielectric having a range of relative permittivity such as a range of about 1-5 that includes a relative permittivity of 1 where the radiation cavity is a vacuum. The radiation cavity may be partially or fully filled with foam. The multimode biconical waveguide may be a monolithic structure.

In example implementations, the ASEA includes an array of radiating elements coupled to multiple modes in the coaxial waveguide. The array of radiating elements may be formed within an area having a shape corresponding to a cross section of the coaxial waveguide (although other shapes may be used). A number of radiating elements in the array of radiating elements may include a range of about 4 to 256 elements and may be configured to excite a number of modes in a range of about 1 to 20 modes in the coaxial waveguide. In one example embodiment, the array includes 56 elements and/or the number of modes is 8. The number of radiating elements and/or number of modes may vary. The multiple modes of the multimode biconical waveguide may include transverse electromagnetic (TEM), transverse electric (TE), and transverse magnetic (TM) modes.

Some example embodiments provide a system that includes an antenna for omnidirectional coverage and directional beam forming including a multimode biconical waveguide having a first conical structure having a first base and a first apex, a second conical structure having a second base and a second apex, the first apex facing the second apex, a radiation aperture, a coaxial interface between the first conical structure and the second conical structure that includes a coaxial waveguide to direct electromagnetic (EM) energy into the radiation aperture, and an active electronic phased array (ASEA) configured to control independent sources of EM wave energy that excite multiple modes of the multimode biconical waveguide. The system also includes an amplitude and phase-shifting network configured to provide an amplitude control signal and a phase control signal to at least some of the independent sources of EM wave energy to generate a predetermined number of modes in the coaxial waveguide. The system also includes processing circuitry configured to generate input signals to the amplitude and phase-shifting network associated with a steerable radiation pattern such that the antenna provides omnidirectional radiation and directional beam steering.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE FIGURES

These and other features and advantages will be better and more completely understood by referring to the following detailed description of example non-limiting illustrative embodiments in conjunction with the drawings. Unless specific dimensions are given in a figure, the figures are not necessarily to scale and are schematic representations.

DETAILED DESCRIPTION

Figure 1:
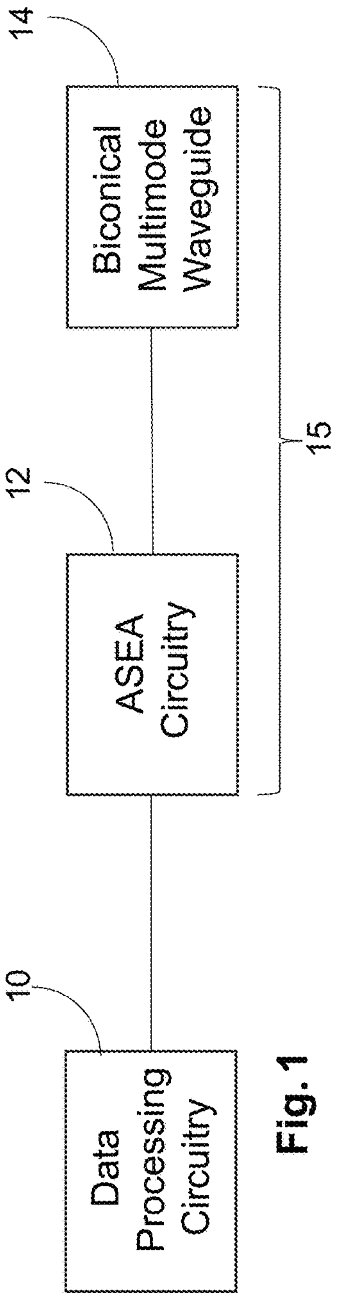
FIG. 1 shows an example embodiment of a system for controlling an antenna for omnidirectional coverage and directional beam forming.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

Line of sight (LOS) links require maximum performance near the horizon with full azimuth coverage. Traditional omnidirectional antennas provide full azimuth coverage but with low antenna performance. In scenarios like air-to-air, air-to-ground, and ground-to-ground communication links, an omnidirectional coverage pattern with increased gain near the horizon is desirable. For on-the-move scenarios where either or both terminals are moving, an ability to scan one or more antenna beams is needed to compensate for terminal movement dynamics. Communication needs of low-earth orbit (LEO) satellite constellations often require beaming forming and steering. Although flat panel phased arrays provide higher antenna performance by beam forming and steering, they do not provide the full azimuth coverage provided by omnidirectional antennas.

The inventor recognized that it would be desirable to provide an antenna that can meet the antenna coverage needs for both types of scenarios. Example embodiments describe an antenna that offers both full azimuth omnidirectional coverage along with the ability to steer and form nulls and beams.

FIG. 1 shows an example embodiment of a system for controlling an antenna for omnidirectional coverage and directional beam forming. Data processing circuitry 10 controls active electronically scanned array (AESA) circuitry 12 which in turn excites a biconical multimode waveguide 14. The ASEA circuitry 12 and biconical multimode waveguide 14 are together referred to as antenna 15.

The data processing circuitry 10 may include one or more hardware processors and one or more memory devices. In some embodiments, each or any of the processors is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). A processor may use an instruction set architecture such as x86 or Advanced RISC Machine (Arm). A memory device may include a random access memory (RAM), a flash memory, a hard disk, a magneto-optical medium, an optical medium, cache memory, a register, or other type of device that performs the volatile or non-volatile storage of data and/or instructions. Memory devices are examples of non-transitory computer-readable storage media.

AESA circuitry 12 includes multiple independent sources of electromagnetic (EM) wave energy (also referred to as antenna elements) that are controlled by processing circuitry 10 to excite multiple modes of the multimode biconical waveguide. Unlike mechanically steered phased arrays, processing circuitry 10 can rotate the radiation pattern generated by the ASEA 12 with relatively small delay, and digital control of transmit/receive gain and as well as timing waveforms helps in beam steering. An amplitude and phase-shifting network provides an amplitude control signal and a phase control signal to some or all of the antenna elements to generate a predetermined number of modes in the coaxial waveguide. In example embodiments, the predetermined number of modes may be in a range of about 1-20. In one example embodiment, the number of modes may be 8. In other embodiments, there may be more than 20 modes. The multiple modes of the multimode biconical waveguide may include transverse electromagnetic (TEM), transverse electric (TE), and transverse magnetic (TM) modes. By changing the phase control signals to some or all of the antenna elements, the direction of the emitted signal can be manipulated. Constructive interference of the signals occurs in the desired direction while destructive interference suppresses signals in other directions. By changing the amplitudes, the beam shape and sidelobe level radiation can be manipulated to further achieve desired performance. Thus, the AESA circuitry 12 provides (without moving parts) a steerable radiation pattern such that the biconical multimode waveguide 14 provides omnidirectional radiation and directional beam steering and is well-suited for a variety of applications including for example military, aviation, and telecommunications applications.

In example embodiments, the multiple antenna elements are arranged in a flat configuration. The ASEA layout (e.g., linear, planar) affects the performance and complexity. For example, the width of the antenna beams depends on the number of elements in the antenna array. The AESA may include thousands of individual radiating elements to provide an antenna structure with better performance having reduced size and less weight. The number of radiating elements may vary. In example embodiments, a number of radiating elements in the array of radiating elements may include a range of about 4 to 256 elements. In one example embodiment, the array may include 56 elements.

Figure 2:
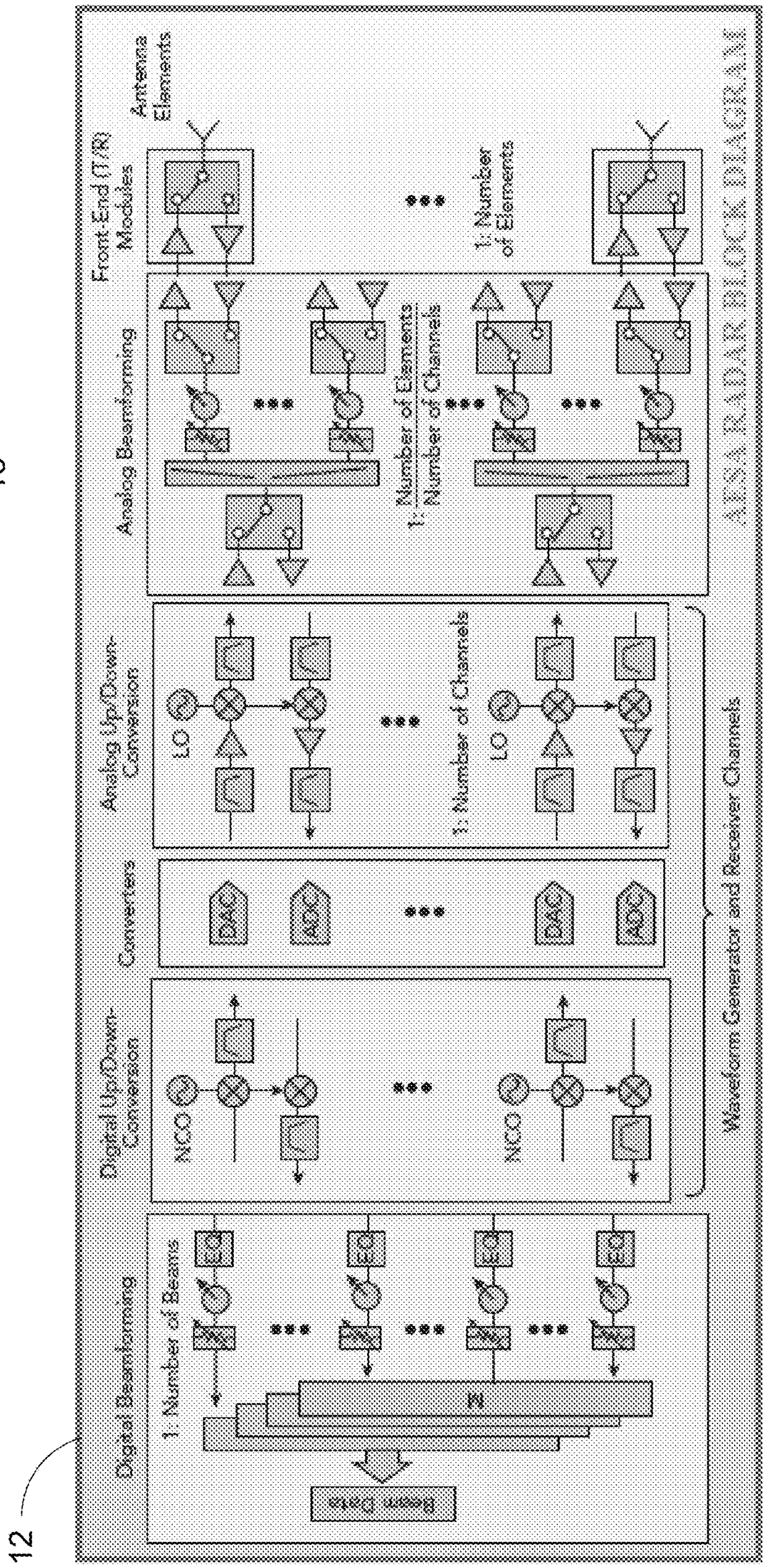
FIG. 2 shows example embodiment of ASEA circuitry.

FIG. 2 shows a known example of ASEA circuitry 12 that includes individual radiating antenna elements. Each antenna element has a solid-state Transmit/Receive (T/R) module that includes a low noise receiver, power amplifier, and digitally controlled gain/phase elements. FIG. 2 shows both analog beamforming as well as digital beamforming elements but different embodiments may only use one or the other. Various components are provided including frequency synthesizers, oscillators, mixers, power amplifiers, low noise amplifiers, phase shifters, transmit/receive switches, temperature sensing equipment, radio frequency (RF) power and phase delay sensing components, splitters, summers, time delay units, and digital and analog control busses in some embodiments.

In the example shown in FIG. 2, both the phase and amplitude of the input signal may be determined by the processing circuitry 10 executing a suitable beam steering algorithm and then applied to individual antenna elements to steer one or more antenna beams both in azimuth and elevation directions. Known beamforming algorithms may be modified to achieve desired radiation patterns. In general, a beamforming algorithm applies phase shift signals corresponding to each antenna element to align radiation from the antennas in time so that they constructively interfere in the desired direction. The delays depend on the spacing between the elements and the speed of light. For simpler beam steering, the signals exciting the array elements may assume a conjugate response of an array factor to maximize the energy in a given direction. The array factor includes complex-valued excitation coefficients and is a measure of how much the transmitted radiation pattern changes because of the grouping of antenna elements. More complicated beamforming algorithms are available and may be used for the inclusion of polarization control and beam nulling.

In some embodiments, processing circuitry 10 provides a set of phase or time delay commands on signal lines in response to a beam pointing angle parameter, an environmental parameter, and a frequency parameter. In some embodiments, the processing circuitry 10 may synthesize aperture amplitude and phase to improve performance. Other example beamforming techniques which may be used are described in U.S. Pat. Nos. 9,735,469 and 10,749,258 which are incorporated herein by reference.

Figure 3:
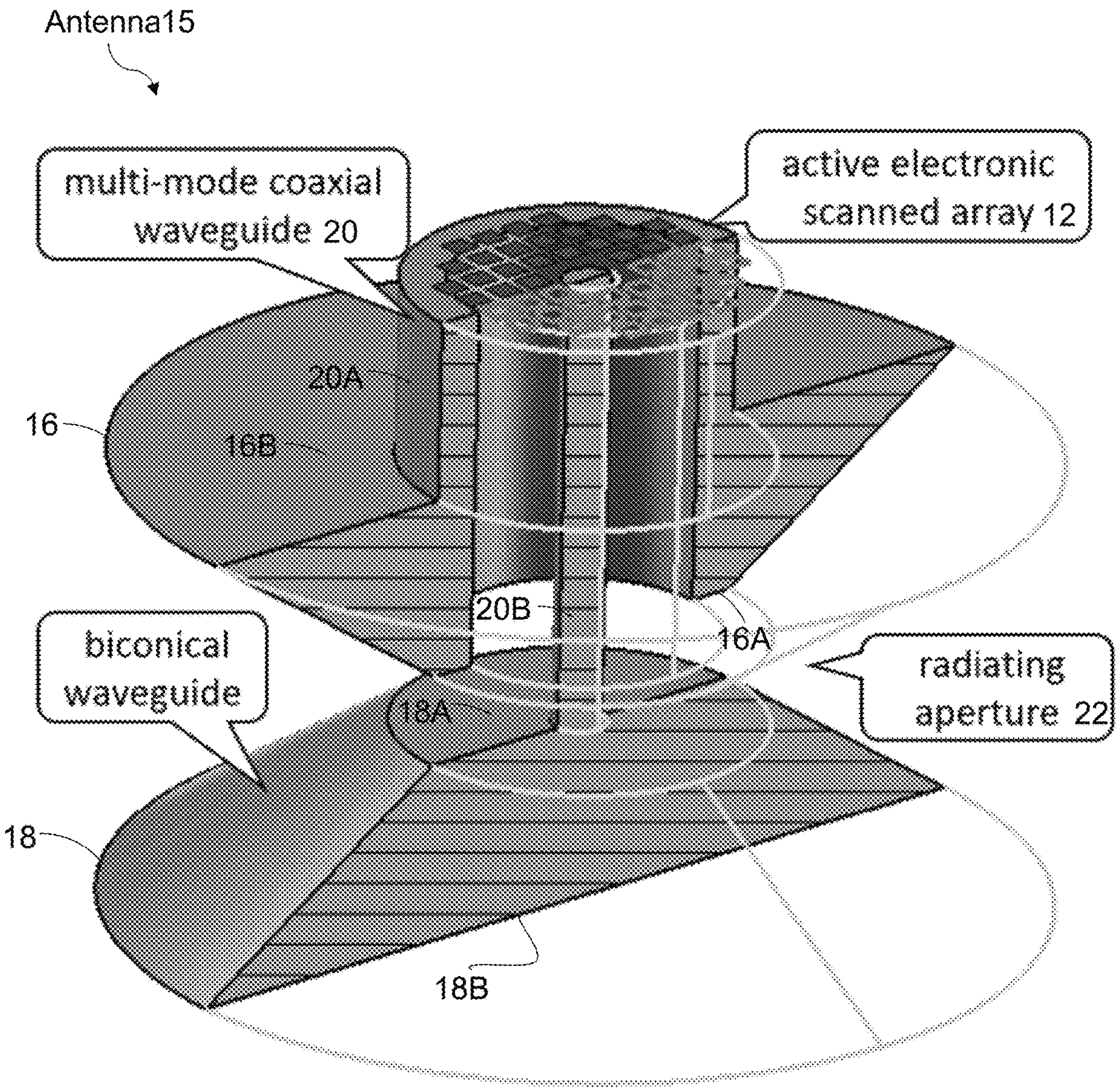
FIG. 3 shows a perspective view of an example embodiment of an antenna for omnidirectional coverage and directional beam forming.

The output of the AESA circuitry 12 excites a biconical multimode waveguide 14, such as the example embodiment shown in FIG. 3, where the AESA 12 feeds a multimode coaxial biconical radiating aperture 22. Typically, a biconical waveguide is fed or excited with a single mode to produce an omnidirectional or azimuthally symmetric pattern. In contrast, processing circuity 10 and ASEA 12 also introduce higher-order coaxial modes to the biconical multimode waveguide 14, and as a result, enable the formation of a beam with increased directed gain and nulls. In other words, the approach in this application allows control over the beam in both azimuth and elevation as well as scaling over a wide range of frequencies for various applications. The radiating aperture 22 of the biconical multimode waveguide 14 omnidirectionally radiates multimode energy generated by the ASEA 12.

FIG. 3 shows a perspective view of an example embodiment of an antenna 15 for omnidirectional coverage and directional beam forming. The antenna 15 includes: a first conical structure 16 having a first base 16B and a first apex 16A, a second conical structure 18 having a second base 18B and a second apex 18A, the first apex 16A facing the second apex 16B, and a radiation aperture 22. A multimode coaxial interface 20 couples the first conical structure 16 and the second conical structure 18 includes a coaxial waveguide that directs electromagnetic (EM) energy from the ASEA circuitry 12 into the radiation aperture 22. At least the surfaces of the first conical structure 16, second conical structure 18, and multimode coaxial interface 20 are made of one or more electrically conductive materials such as copper, silver, aluminum, etc. The multimode coaxial interface 20 is cylindrically shaped and has an upper shield portion 20A and a center core portion 20B. The upper shield portion 20A extends beyond the top surface of the first conical structure 16. The upper shield portion 20A and the center core portion 20B are separated by dielectric medium such as air, foam, or a combination of different dielectric materials or mediums. The center core portion 20B extends from the second apex 18A through the first conical structure 16 to a top surface of upper shield portion 20A where it physically contacts with the ASEA circuitry 12 and preferably is secured using for example screws, glue, or other securing mechanism. As described above, the ASEA 12 controllably activates independent sources of EM wave energy (e.g., antenna elements) that excite multiple modes of the multimode biconical waveguide and provide omnidirectional radiation and directional beam steering. The radiation cavity 22 between the facing surfaces of the first conical structure 16 and the second conical structure 18 defines the physical dimensions of the radiation aperture. The radiation cavity 22 may include a dielectric having a range of relative permittivity such as a range of about 1-5 that includes a permittivity of 1 if the radiation cavity 22 is a vacuum. Alternatively, the radiation cavity 22 may be partially or fully filled with foam or other dielectric.

The dimensions of the first conical structure 16, the second conical structure 18, the multimode coaxial interface 20, and the radiating aperture 22 in FIG. 3 may be determined based on the desired radiation patterns for a particular application. For example, there is a relationship between gain and the effective aperture size where the larger the aperture the greater the gain. In example implementations, the multimode biconical waveguide 14 in FIG. 3 may be dimensioned and constructed as a monolithic structure using, for example, additive-manufacturing (3D printing) and metal deposition as described for example in R. G. Edwards et al., "Additive-Manufactured, Highly-Conductive Metasurfaces, With Application Enabling Secondary Properties, for Microwave Waveguide Components," in IEEE Access, vol. 10, pp. 58921-58929, 2022, and R. G. Edwards et al., "Effective Conductivity of Additive-Manufactured Metals for Microwave Feed Components," in IEEE Access, vol. 9, pp. 59979-59986, 2021.

Figure 4:
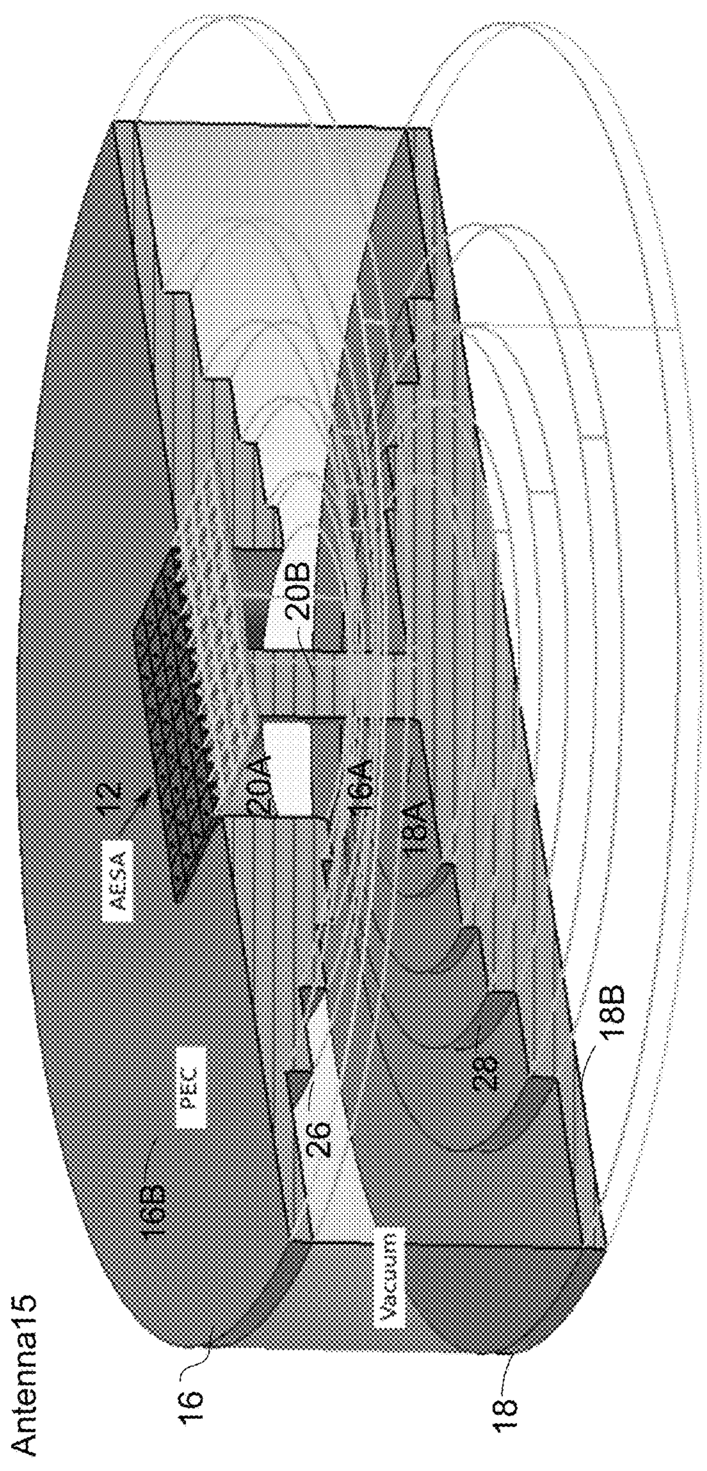
FIG. 4 shows a perspective view of an example embodiment of an antenna for omnidirectional coverage and directional beam forming.

FIG. 4 shows a perspective view of another example embodiment of an antenna 15 for omnidirectional coverage and directional beam forming. The antenna 15 is similar to that in FIG. 3 with some structural differences. First the top surface of upper shield portion 20A and the end of the core portion 20B do not extend beyond the top surface of the first base 16B. Second, the facing surfaces of the first conical structure 16 and second conical structure 18 are stepped. The first conical structure 16 includes steps 26, and the second conical structure 18 includes steps 28. These steps add extra degrees of freedom in the design process and can be used to optimize the design for improved performance. In example implementations, the multimode biconical waveguide in FIG. 4 may be dimensioned and constructed as a monolithic structure using, for example, additive-manufacturing and metal deposition as described for example in the two articles above. As with the example embodiment in FIG. 3, the dimensions of the first conical structure 16, the second conical structure 18, the multimode coaxial interface 20, and the radiating aperture 22 in FIG. 4 may be determined based on the desired radiation patterns for a particular application.

Figure 5:
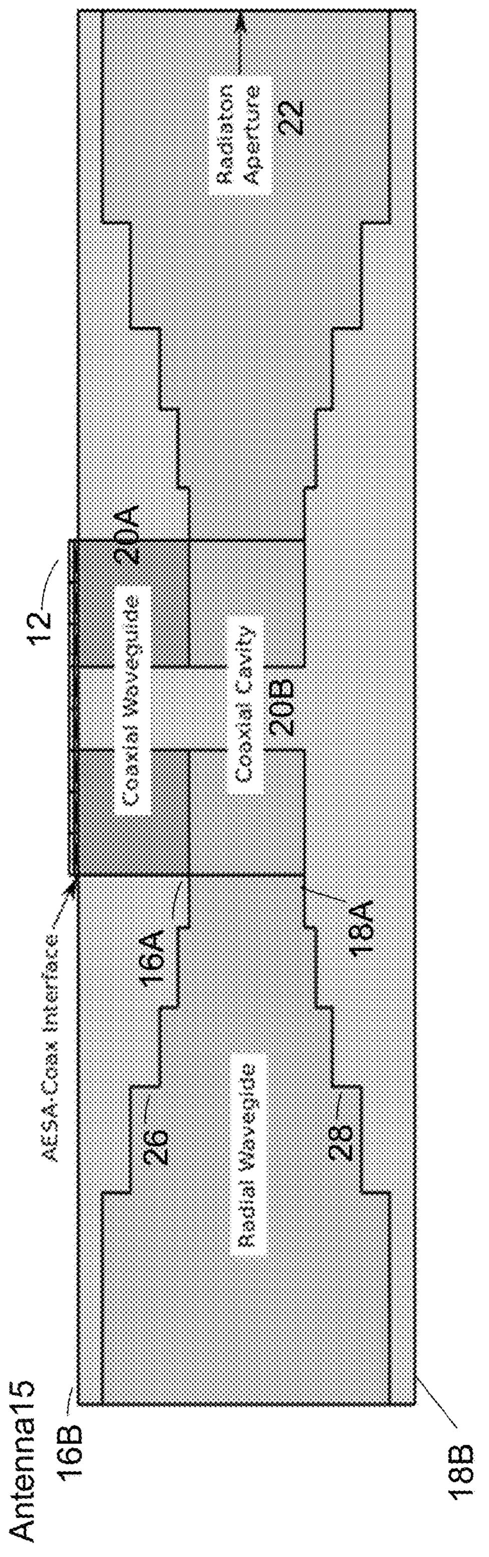
FIG. 5 shows a cross-sectional view of the antenna in FIG. 4.

FIG. 5 shows a cross-sectional view of the antenna 15 in FIG. 4. The shape of the radiation aperture resembles a horn shape.

Figure 6:
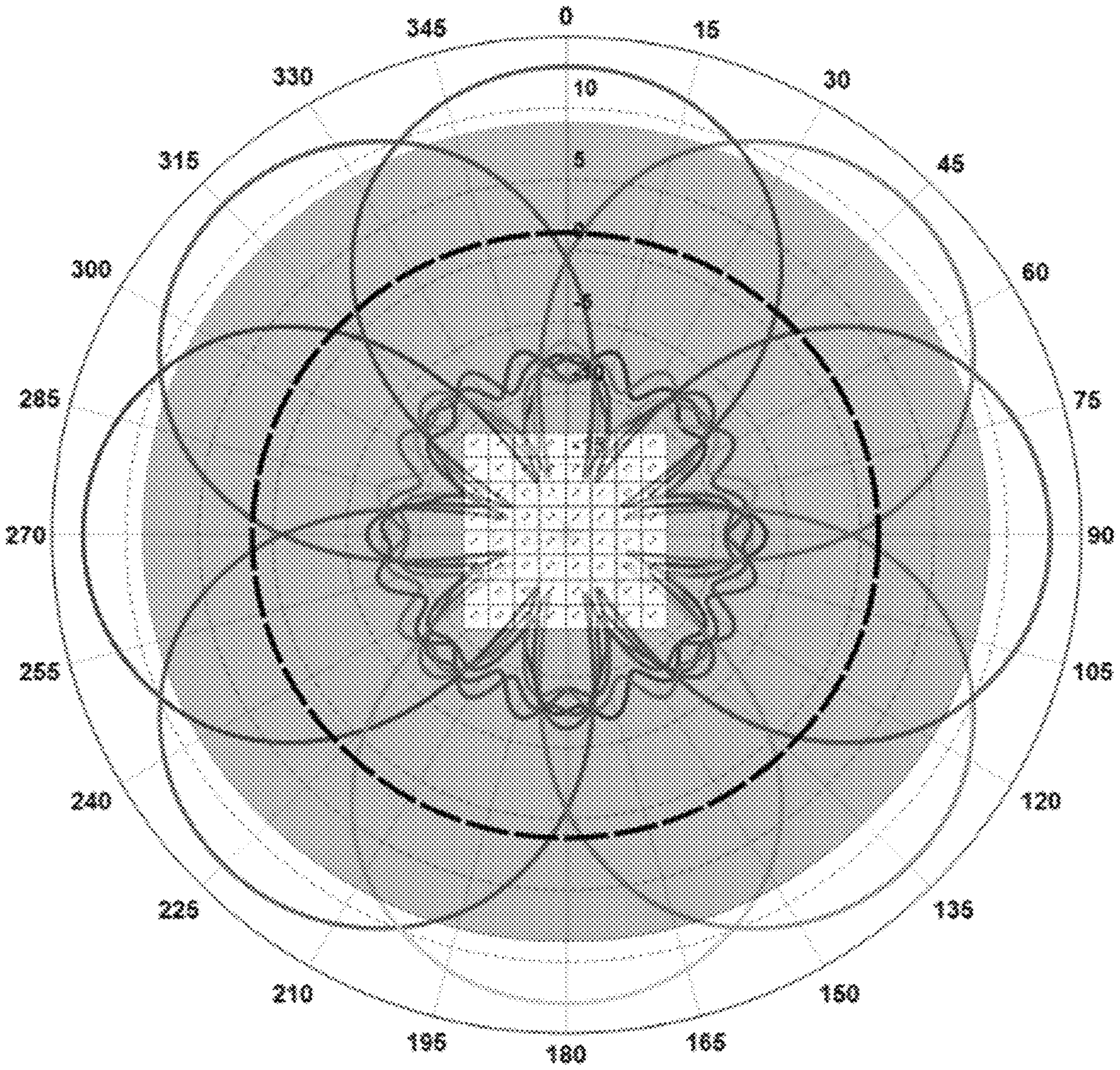
FIG. 6 shows a diagram of an example radiation pattern in azimuth for the antenna in FIG. 4.

FIG. 6 shows a diagram of an example radiation pattern in azimuth for the antenna in FIG. 4. The dashed lines show omnidirectional coverage of the antenna 15 in azimuth with controllable gain near a horizon. The controllable gain near the horizon may be in a range of about 0 dB-20 dB. The solid lines show a variety of directional beams at 0°, 45°, 90°, 135°, 180°, 225°, 270°, and 315° providing targeted coverage.

Figure 7:
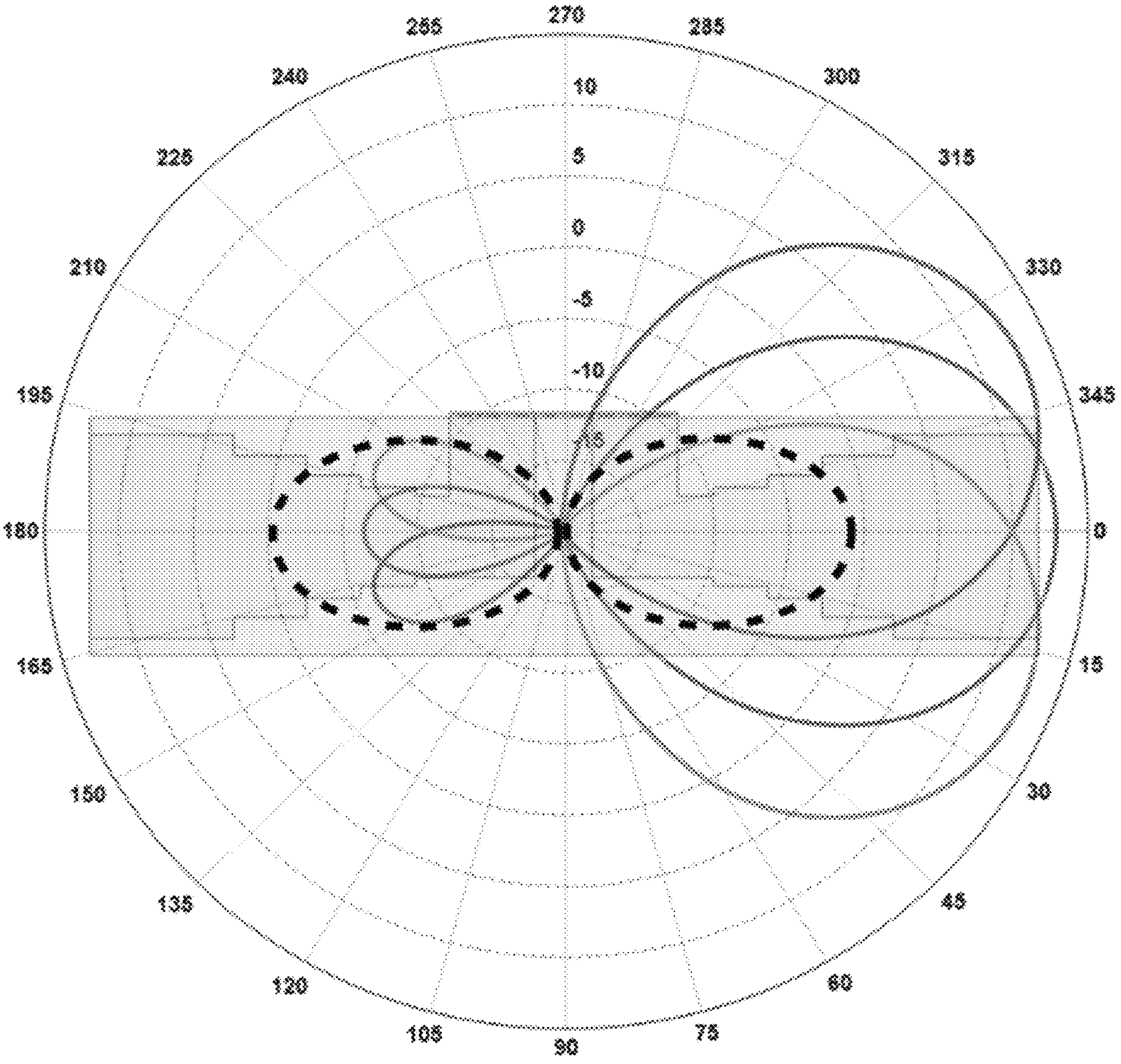
FIG. 7 is a diagram of an example radiation pattern in elevation for the antenna in FIG. 4.

FIG. 7 is a diagram of an example radiation pattern in elevation for the antenna in FIG. 4. The directional beam steering includes one or more radiation beams steerable in elevation. The ASEA is controllable to rapidly change radiation beams including nulling in some directions and focused in other directions. The dashed omnidirectional beams and solid directional beams are superimposed with the cross-sectional view of the antenna 15 from FIG. 4.

Figure 8:
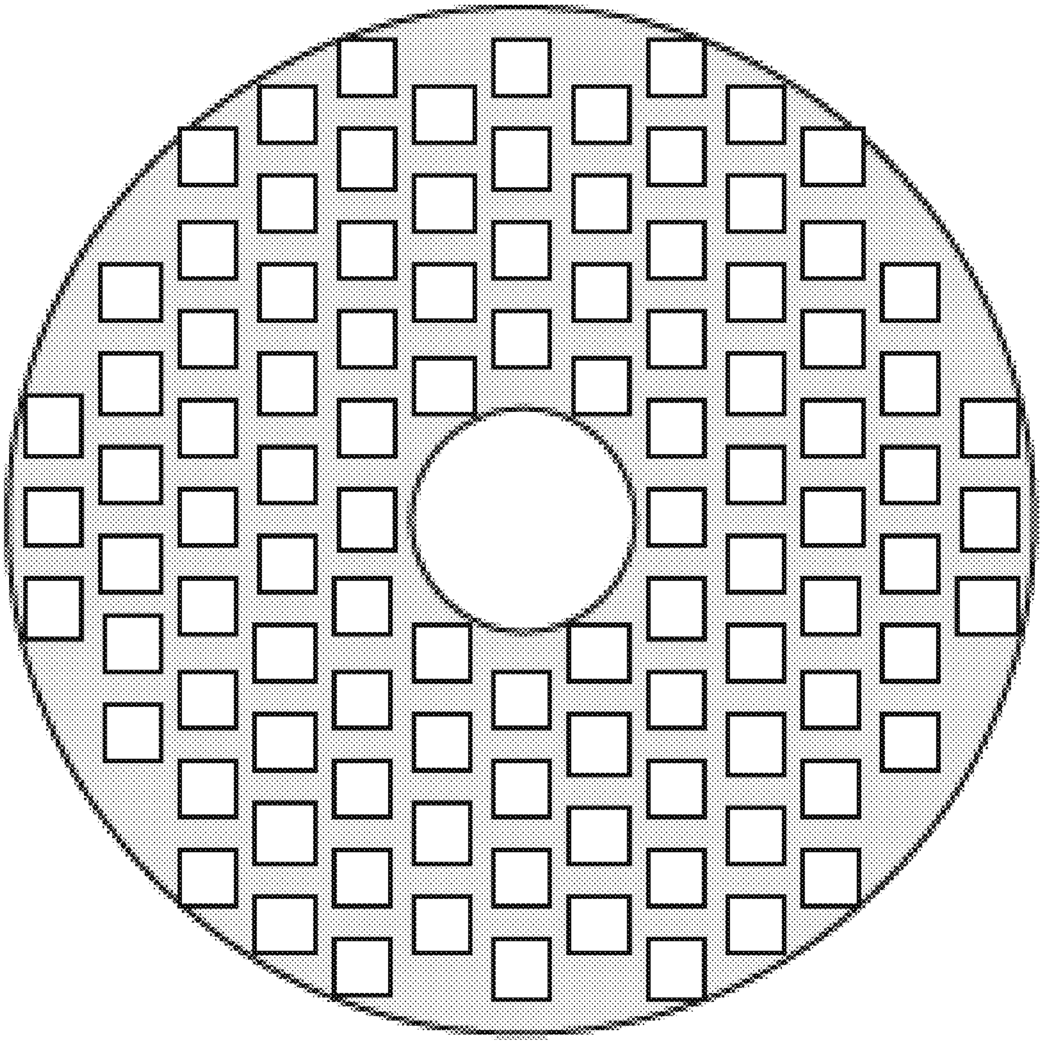
FIG. 8 is an example embodiment of a circularly shaped ASEA panel for exciting multiple modes in the antenna of FIGS. 3 and/or 4.

FIG. 8 is an example embodiment of a circularly shaped ASEA panel for exciting multiple modes in the in the coaxial waveguide 20 and ultimately the radiation aperture 22 of FIGS. 3 and/or 4. The array of radiating elements may be formed within an area having a shape corresponding to a cross section of the coaxial waveguide (although other shapes may be used). A number of radiating elements in the array of radiating elements may include a range of about 4 to 256 elements and in one example embodiment may include 56 elements. The radiating elements are configured to excite a number of modes in a range of about 1-20 in the coaxial waveguide and in one example embodiment may excite 8 modes. The number of radiating elements and/or number of modes may vary. The multiple modes of the multimode biconical waveguide may include transverse electromagnetic (TEM), transverse electric (TE), and transverse magnetic (TM) modes.

Figure 9:
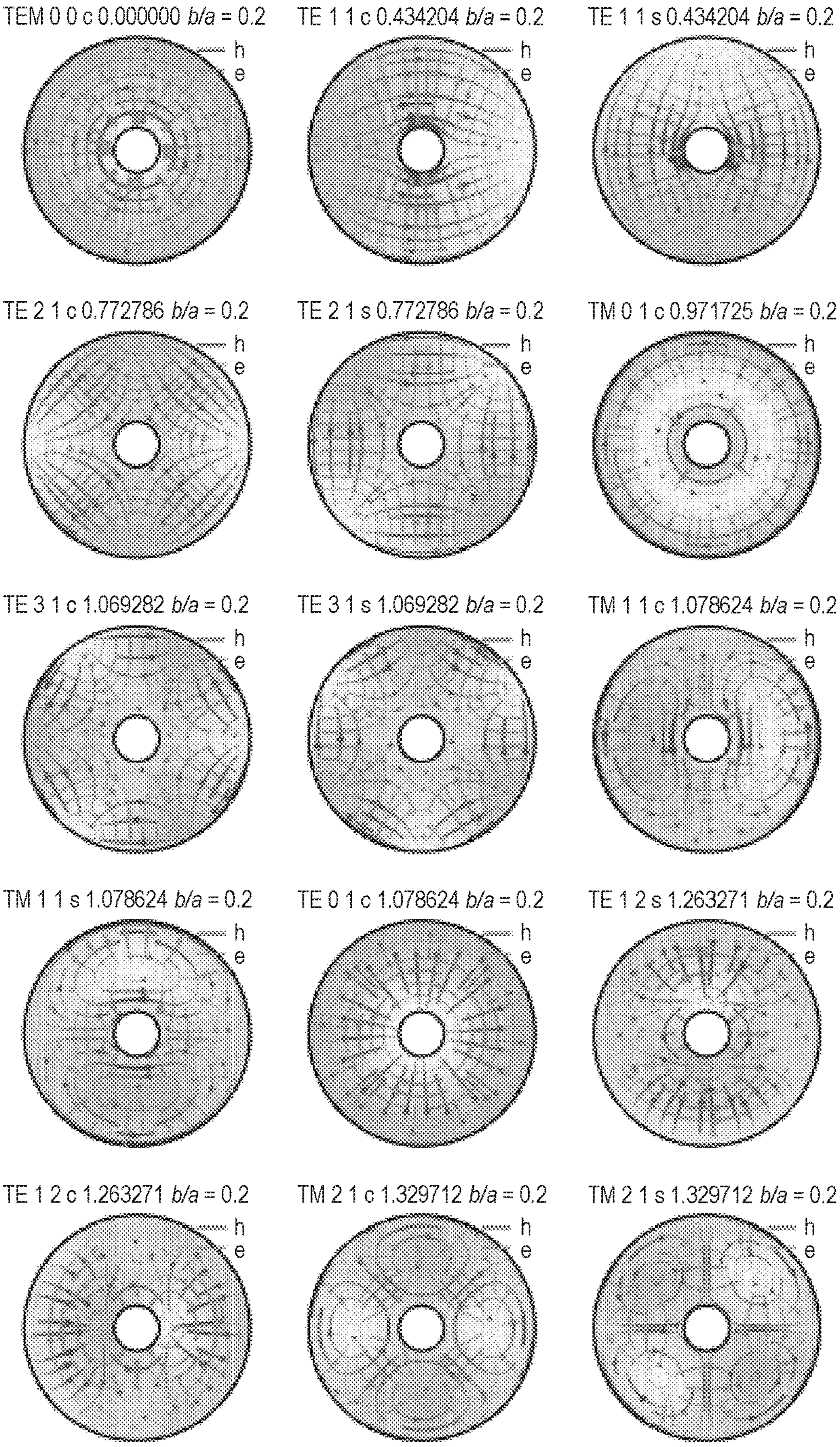
FIG. 9 are example TE and TM mode diagrams for example implementations of the antenna of FIGS. 3 and/or 4.

FIG. 9 are example TEM, TE and TM mode diagrams for example implementations of the antenna of FIGS. 3 and/or 4. The modes shown an orthogonal basis for describing any arbitrary set of electric and magnetic fields in the waveguide. The linear combination of the individual modes allows for the desired beams and nulls once radiated from the aperture.

Example Advantages and Applications

Example advantages of the technology described above include providing an antenna that offers both full azimuth omnidirectional coverage (i.e., sending and receiving signals from all directions providing consistent coverage over a wide area) along with the ability to steer and form nulls and beams. Providing beam forming and nulling capabilities to traditional (line of sight) LOS and BLOS platforms (including air-to-air, air-to-ground, and ground-to-ground communication link) that also maximum performance near the horizon with full azimuth coverage increases performance and broadens capabilities. The beamforming and nulling capabilities of the antenna are also valuable for on-the-move scenarios because scan one or more antenna beams compensates for platform dynamics.

In scenarios like air-to-air, air-to-ground, and ground-to-ground communication links, an omnidirectional coverage pattern with increased gain near the horizon is desirable. Omnidirectional antennas can receive signals from multiple terminals (e.g., airborne and/or ground terminals) to achieve rapid fixes as well as receive signals from multiple cellular base stations at different locations. For on-the-move scenarios, an ability to scan one or more antenna beams is needed to compensate for platform dynamics. Furthermore, beamforming directs a wireless signal to a specific device, resulting in higher signal quality and faster, more accurate information transfer, while at the same time, only transmitting signals where needed and thereby reducing interference. Beamforming also can improve network throughput and/or capacity by creating a more direct connection between a transmitter and receiver and/or by supporting higher order modulation.

Example applications of the technology described above include communication systems that require omnidirectional radiation coverage patterns for air-to-air and air-to-ground links along with steerable high gain-beams including military, aviation, vehicular, and telecommunications applications as well as remote sensing and control systems, like Supervisory Control and Data Acquisition (SCADA) systems, signal intelligence (SIGINT), and intelligence, surveillance, reconnaissance (ISR) applications, telecommunications, IoT (Internet of Things), defense, healthcare, industrial automation, navigation, and space exploration. Other advantages include low probability of detection (LPD) to improve security and privacy for wireless networks. Additionally, due to the orthogonal modes or channels in the antenna waveguide, Multiple-Input Multiple-Output (MIMO), techniques can be utilized to increase data throughput.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Features of the embodiments described above may be combined unless clearly technically impossible. Moreover, it is not necessary for a device or method to address each and every problem sought to be solved by the present invention, for it to be encompassed by the invention. No embodiment, feature, element, component, or step in this document is intended to be dedicated to the public.

Terms, such as first, second, and the like, may be used to describe various components. Each of these terminologies is not used to define an essence, order or sequence of a corresponding component but used merely to distinguish the corresponding component from other component(s). For example, a "first" component may be referred to as a "second" component, and similarly, the "second" component may be referred to as the "first" component. "Based on" as used herein covers based at least on. As used throughout this application, the word "may" is used in a permissive sense (i.e., meaning having the potential to), rather than the mandatory sense (i.e., meaning must). The singular forms "a", "an", and "the" are intended to include the plural forms as well, unless the context clearly indicates otherwise. It will be further understood that the terms "comprises/comprising" and/or "includes/including" when used herein, specify the presence of stated features, steps, operations, elements, and/or components, but do not preclude the presence or addition of one or more other features, integers, steps, operations, elements, components and/or groups thereof.

The same name may be used to describe an element included in the embodiments described above and an element having a common function. Once a component or function is described for one embodiment, that description is not repeated for other embodiments where that component or function operates or performs similarly. Unless disclosed to the contrary, a configuration of components disclosed in any embodiment may be applied to other embodiments, and the specific description of the repeated configuration will be omitted.

Unless otherwise defined, all terms used herein including technical or scientific terms have the same meaning as commonly understood by one of ordinary skill in the art to which an example belongs. Terms, such as those defined in commonly used dictionaries, are to be interpreted as having a meaning that is consistent with their meaning in the context of the relevant art and are not to be interpreted in an idealized or overly formal sense unless expressly so defined herein.

The term "about" or "approximately" means an acceptable error for a particular recited value, which depends in part on how the value is measured or determined. In certain embodiments, "about" can mean one or more standard deviations. When the antecedent term "about" is applied to a recited range or value it denotes an approximation within the deviation in the range or value known or expected in the art from the measurement's method. For removal of doubt, it is understood that any range stated herein that does not specifically recite the term "about" before the range or before any value within the stated range inherently includes such term to encompass the approximation within the deviation noted above.

What is claimed is:

1. An antenna for omnidirectional coverage and directional beam forming comprising:

a multimode biconical waveguide including:

a first conical structure having a first base and a first apex, a second conical structure having a second base and a second apex, the first apex facing the second apex, a radiation aperture, and a coaxial interface between the first conical structure and the second conical structure that includes a coaxial waveguide to direct electromagnetic (EM) energy into the radiation aperture, and an active electronic phased array (ASEA) configured to control independent sources of EM wave energy that excite multiple modes of the multimode biconical waveguide and provide omnidirectional radiation and directional beam steering.

2. The antenna in claim 1, wherein the omnidirectional coverage includes an omnidirectional antenna coverage pattern in azimuth with controllable gain near a horizon.

3. The antenna in claim 2, wherein the controllable gain near the horizon is in a range of about 0 dB-20 dB.

4. The antenna in claim 1, wherein the directional beam steering includes one or more radiation beams steerable in elevation.

5. The antenna in claim 1, wherein the ASEA is controllable to change radiation beams including nulling in some directions and focused in other directions.

6. The antenna in claim 1, wherein the multimode biconical waveguide includes a radiation cavity between facing surfaces of the first conical structure and the first conical structure that defines physical dimensions of the radiation aperture.

7. The antenna in claim 6, wherein the radiation cavity includes a dielectric having a relative permittivity in a range of about 1-5.

8. The antenna in claim 6, wherein the radiation cavity is a vacuum.

9. The antenna in claim 6, wherein the radiation cavity is at least partially filled with foam.

10. The antenna in claim 1, wherein the multimode biconical waveguide is a monolithic structure.

11. The antenna in claim 1, wherein the ASEA includes an array of radiating elements coupled to multiple modes in the coaxial waveguide.

12. The antenna in claim 11, wherein the array of radiating elements is formed within an area having a shape corresponding to a cross section of the coaxial waveguide.

13. The antenna in claim 11, wherein a number of radiating elements in the array of radiating elements includes a range of about 4 to 256 elements and are configured to excite a number of modes in a range of about 1 to 20 modes in the coaxial waveguide.

14. The antenna in claim 1, wherein the multiple modes of the multimode biconical waveguide include transverse electromagnetic (TEM), transverse electric (TE), and transverse magnetic (TM) modes.

15. A system comprising:

an antenna for omnidirectional coverage and directional beam forming including a multimode biconical waveguide having a first conical structure having a first base and a first apex, a second conical structure having a second base and a second apex, the first apex facing the second apex, a radiation aperture, a coaxial interface between the first conical structure and the second conical structure that includes a coaxial waveguide to direct electromagnetic (EM) energy into the radiation aperture, and an active electronic phased array (ASEA) configured to control independent sources of EM wave energy that excite multiple modes of the multimode biconical waveguide;

an amplitude and phase-shifting network configured to provide an amplitude control signal and a phase control signal to at least some of the independent sources of EM wave energy to generate a predetermined number of modes in the coaxial waveguide; and processing circuitry configured to generate input signals to the amplitude and phase-shifting network associated with a steerable radiation pattern such that the antenna provides omnidirectional radiation and directional beam steering.

16. The system in claim 15, wherein the omnidirectional coverage includes an omnidirectional antenna coverage pattern in azimuth with the processing circuitry configured to generate input signals to the amplitude and phase-shifting network to control a gain near a horizon.

17. The system in claim 16, wherein the gain near the horizon is in a range of about 0 dB-20 dB.

18. The system in claim 15, wherein the directional beam steering includes one or more radiation beams steerable in elevation.

19. The system in claim 15, wherein the processing circuitry is configured to generate input signals to the amplitude and phase-shifting network to control the ASEA to change radiation beams including nulling in some directions and focused in other directions.

* * * * *